(12) United States Patent
Vago (10) Patent No.: US 8,858,805 B2
(45) Date of Patent: *Oct. 14, 2014

(54) METHOD AND DEVICE FOR REMOVAL OF AMMONIA AND RELATED CONTAMINANTS FROM WATER

(76) Inventor: Robert Edward Vago, Osprey, FL (US)

( * ) Notice: Subject to any disclaimer, the term of this patent is extended or adjusted under 35 U.S.C. 154(b) by 911 days.

This patent is subject to a terminal disclaimer.

(21) Appl. No.: 12/588,543

(22) Filed: Oct. 19, 2009

(65) Prior Publication Data

US 2010/0038320 A1    Feb. 18, 2010

Related U.S. Application Data (63) Continuation-in-part of application No. 11/534,008, filed on Sep. 21, 2006, now Pat. No. 7,624,703, which is a continuation-in-part of application No. 11/042,607, filed on Jan. 25, 2005, now Pat. No. 7,393,323.

(60) Provisional application No. 60/719,616, filed on Sep. 22, 2005.

(51) Int. Cl.
    C02F 1/36      (2006.01)
    B06B 1/00      (2006.01)
    A01K 63/04     (2006.01)
    C02F 101/16    (2006.01)
    C02F 103/20    (2006.01)

(52) U.S. Cl.
    CPC ............. *A01K 63/04* (2013.01); *C02F 2101/16* (2013.01); *C02F 2103/20* (2013.01); *C02F 1/36* (2013.01)
    USPC ...... 210/748.04; 210/739; 210/143; 210/610; 210/705; 210/607; 210/189; 429/504

(58) Field of Classification Search
    CPC .... C02F 1/36; C02F 2103/20; C02F 2101/16; B01D 21/2433; B01D 21/245; B01D 2251/2067; B01D 2259/816; A01B 12/006
    USPC ......... 600/407, 437; 601/2; 422/20, 128, 358, 422/235; 210/739, 748.04, 607, 189
    See application file for complete search history.

(56) References Cited

U.S. PATENT DOCUMENTS

| | | | |
|---|---|---|---|
| 4,307,613 A * | 12/1981 | Fox | 73/626 |
| RE31,779 E | 12/1984 | Alliger | |
| 4,942,868 A | 7/1990 | Vago | |

(Continued)

FOREIGN PATENT DOCUMENTS

WO    2006/017561 A2    2/2006

OTHER PUBLICATIONS

Philip Lymbery "The Welfare of Farmed Fish"; May 1992; pp. 1-27.

(Continued)

*Primary Examiner* — Baisakhi Roy (74) *Attorney, Agent, or Firm* — Buchanan Ingersoll & Rooney PC (57) ABSTRACT

A sono-molecular-conversion device and method for effecting nitrification of ammonia in water, the method including feeding the water containing ammonia through a sono-molecular conversion device including a plurality of ultrasound transducers; and applying ultrasonic energy to the water containing ammonia by the sono-molecular conversion device to ultrasonically collapse microsized bubbles with transient cavitation in the water containing ammonia to effect nitrification of ammonia therein by sono-molecular-conversion.

13 Claims, 9 Drawing Sheets

(56) References Cited

U.S. PATENT DOCUMENTS

| | | | |
|---|---|---|---|
| 5,048,520 A | 9/1991 | Vago | |
| 5,178,134 A | 1/1993 | Vago | |
| 5,305,737 A | 4/1994 | Vago | |
| 5,523,058 A | 6/1996 | Umemura et al. | |
| 5,665,141 A | 9/1997 | Vago | |
| 5,694,936 A | 12/1997 | Fujimoto et al. | |
| 5,734,588 A * | 3/1998 | Rose et al. | 702/39 |
| 6,036,644 A | 3/2000 | Schutt | |
| 6,071,473 A * | 6/2000 | Darwin | 422/20 |
| 6,133,004 A * | 10/2000 | Sato et al. | 435/180 |
| 6,206,843 B1 | 3/2001 | Iger et al. | |
| 6,382,134 B1 | 5/2002 | Gruenberg et al. | |
| 6,395,096 B1 | 5/2002 | Madanshetty | |
| 6,476,622 B1 | 11/2002 | Robinson, Jr. | |
| 6,719,449 B1 | 4/2004 | Laugharn, Jr. et al. | |
| 6,863,826 B2 | 3/2005 | Sheets | |
| 6,948,843 B2 | 9/2005 | Laugharn et al. | |
| 7,008,538 B2 | 3/2006 | Kasparian et al. | |
| 7,033,503 B2 * | 4/2006 | Park et al. | 210/609 |
| 7,377,905 B2 * | 5/2008 | Vago | 601/2 |
| 7,393,323 B2 * | 7/2008 | Vago | 600/437 |
| 7,413,552 B2 * | 8/2008 | Vago | 601/2 |
| 7,422,680 B2 | 9/2008 | Sheets | |
| 7,521,023 B2 * | 4/2009 | Laugharn et al. | 422/128 |
| 7,624,703 B2 * | 12/2009 | Vago | 119/215 |
| 7,857,744 B2 * | 12/2010 | Langley et al. | 494/45 |
| 2003/0173276 A1 * | 9/2003 | Arnaud | 210/143 |
| 2004/0049134 A1 | 3/2004 | Tosaya et al. | |
| 2004/0114467 A1 * | 6/2004 | Wiener-Avnear et al. | 367/180 |
| 2005/0017599 A1 | 1/2005 | Puskas | |
| 2005/0038361 A1 | 2/2005 | Zhong et al. | |
| 2005/0075587 A1 | 4/2005 | Vago | |
| 2005/0143638 A1 | 6/2005 | Johnson et al. | |
| 2005/0150830 A1 | 7/2005 | Laugharn et al. | |
| 2006/0009693 A1 | 1/2006 | Hanover et al. | |
| 2006/0009696 A1 | 1/2006 | Hanover et al. | |
| 2006/0021642 A1 | 2/2006 | Sliwa, Jr. et al. | |
| 2006/0147361 A1 * | 7/2006 | Spokoyny | 423/235 |
| 2006/0158956 A1 | 7/2006 | Laugharn et al. | |
| 2006/0162667 A1 * | 7/2006 | Papadoyianis et al. | 119/223 |
| 2007/0167880 A1 | 7/2007 | Vago | |
| 2007/0167983 A1 | 7/2007 | Vago | |
| 2008/0038180 A1 * | 2/2008 | Spokoyny | 423/358 |
| 2008/0110828 A1 * | 5/2008 | Yerushalmi et al. | 210/620 |
| 2008/0283411 A1 * | 11/2008 | Eastman et al. | 205/343 |
| 2008/0283469 A1 * | 11/2008 | Pollock | 210/608 |
| 2008/0292511 A1 * | 11/2008 | Spokoyny | 422/128 |
| 2010/0187182 A1 * | 7/2010 | Vago | 210/739 |
| 2010/0320147 A1 * | 12/2010 | McGuire et al. | 210/638 |

OTHER PUBLICATIONS

K.F. Graff "A History of Ultrasonics"; Chapter 1 of "Physical Acoustics"; vol. 15, Mason and Thurston; Academic Press; 1981.
National Academy Press; "Long Range Options: Advanced Method for Handling Liquid Waste"; 1996; pp. 1-8.
James B. Duncan, Ph.D "Bonneville Power Administration FY 2001 Innovative Project Proposal Review"; 2001; pp. 1-8.
Dana Stone "Dealing With a Toxic Threat"; News in Engineering, The Ohio State University College of Engineering; vol. 71, No. 3; Dec. 1999, pp. 1-3.
Svein Vagle "On the Impact of Underwater Pile-Driving Noise on Marine Life"; Ocean Science and Productivity Division; Institute of Ocean Sciences; DFO/Pacific; Feb. 2003; pp. 1-41.
G. Scherba et al. "Quantitative Assessment of the Germicidal Efficacy of Ultrasonic Energy"; Department of Veterinary Pathobiology; Department of Electrical and Computer Engineering, University of Illinois; Applied and Environmental Microbiology; Jul. 1991; 1991—American Society for Microbiology pp. 2079-2084.
William D. O'Brien, Jr., Ph.D, et al. "Mouse Lung Damage From Exposure to 30 kHz Ultrasound"; Ultrasound in Medicine and Biology, 1994; pp. 1-24.
William D. O'Brien, Jr., et al. "Comparison of Mouse and Rabbit Lung Damage Exposure to 30 kHz Ultrasound"; Ultrasound in Medicine and Biology, 1994; vol. 2, No. 3; pp. 299-307.
William D. O'Brien, Jr., et al. "Rabbit and Pig Lung Damage Comparison From Exposure to Continuous Wave 30 kHz Ultrasound"; Ultrasound in Medicine and Biology, 1996; vol. 22, No. 3; pp. 345-353.
Graph, Watts/cm2 vs. Frequency—mHz; Graph Modified From Esche, 1952.
O.I. Babikov; "Cavitation Energy vs. Viscosity", Ultrasonics and Its Industrial Application; Translated from the Russian Consultants Bureau; 1960.
H. Schöne et al.; "Quality Control of Disinfection in Ultrasonic Baths"; TU Hamburg-Harburg Reports on Sanitary Engineering 35; 2002; Ultrasound in Environmental Engineering II, pp. 1-8.
Scientific American; Feb. 1989; pp. 84.
Louis A. Helfrich et al. Fish Farming in Recirculating Aquaculture Systems (RAS); Department of Fisheries and Wildlife Sciences; Virginia Tech; pp. 1-15.
Dr. Ying Q. Ji et al., "Evaluation of Recirculating Aquaculture Systems"; Minnesota Department of Agriculature and the University of Minnesota; Oct. 1997; pp. 1-33.
International Search Report issued in a corresponding PCT application, dated Nov. 14, 2005.
International Search Report issued in a corresponding PCT application, dated Aug. 15, 2006.
Kenneth S. Suslick "The chemical and Pysical Effects of Ultrasound"; Summary of Sonochemistry and Sonoluminescence Research Group Chemistry; pp. 1-10; 2006.
USPTO Search ABST/(Ammonia and Nitrification); pp. 1-2.
70 pages of Google Search (Ammonia and Nitrification).
Brennen, Christopher-Earls; "Quality Control of Disinfection in Ultrasonic Baths" 1995, Oxford University Press; Chapters 1-4.

* cited by examiner

METHOD AND DEVICE FOR REMOVAL OF AMMONIA AND RELATED CONTAMINANTS FROM WATER

CROSS-REFERENCE TO RELATED APPLICATIONS

The present application claims the benefit under 35 USC 119(e) of U.S. Provisional Patent Application No. 60/719,616, filed Sep. 22, 2005. The present application is also a continuation-in-part of U.S. Ser. No. 11/534,008, filed on Sep. 21, 2006, which is a continuation-in-part of U.S. Ser. No. 11/042,607, filed in the U.S. on Jan. 25, 2005. The subject matter of U.S. Provisional Patent Application No. 60/719,616; U.S. Ser. No. 11/534,008; and U.S. Ser. No. 11/042,607 is incorporated herein by reference.

FIELD OF THE INVENTION

This invention relates to a non-microbial method and device for detoxification of ammonia, nitrite and nitrates by nitrification and mineralization of carbon suspended solids contained by water, including, but not limited to tertiary waste water intended for discharge into public waterways and lakes by petroleum processors, paper-makers, and steel manufacturers, among others.

BACKGROUND OF THE INVENTION

McMaster University Centre for Engineering and Public Policy brought to public notice an Apr. 29, 2010, "Climate of Change" Symposium: "Making the Lakes Great". The stated objectives are discussions on actions which will affect Ecosystem Threat Reduction and thereby adapt or improve resilience of the large lakes and also mitigate green house gas emissions and effect.

Although there are technology similarities between the present application and U.S. Ser. No. 11/534,008, the present invention includes process separation between the nitrification, and mineralization for providing continuous, environment-friendly nitrogen ($N_2$) release. Although nitrogen ($N_2$) release is possible with current microbial de-nitrification, it could prove unsatisfactory for addressing the vast quantity of global industrial waste water at hand and curbing global warming because of its necessary release of carbon dioxide and methane green house gases to atmosphere.

Similarly, U.S. Ser. No. 11/534,008 discloses non-microbial ammonia reduction with continuous recirculation contaminant flow where an accumulating rate (mg/l/hr) of fish generated ammonia concentration was negated by an opposite and opposing rate of sonic ammonia molecular dissociation.

Contaminated tertiary waste water, delivered by industry for de-contamination contains significant ammonia or nitrate concentrations which can be reduced to an acceptable regulatory level with either a SMC (sono-molecular conversion) low-volume single molecular dissociation pass, or a high volume with repetitive recirculation molecular dissociation passes.

At a specific rate (mg/l/hr), this invention associates nitrate/nitrite to ammonia while mineralizing organic carbon to ammonia ($NH_3$), thereafter, nitrification, dissociates $NH_3$ to nitrite ($NO_2$), then dissociates nitrite to nitrate ($NO_3$) and finally dissociates nitrate to nitrogen gas ($N_2$) where after the de-contaminated tertiary waste water is ready for discharge into public waterways and/or Great Lakes.

Current microbial processing technology for treating industrial tertiary waste water ammonia consists of two separate microbial processes; the first for ammonia nitrification and the second for nitrate de-nitrification. The device name applied to these two waste water treatment processes is "Sequencing Batch Reactor" (SBR).

For the nitrification-only purpose, the reactor is tagged single-stage and for de-nitrification-only purpose, second-stage.

The Single Stage Reactor performs an aerobic bacteria nitrification process, changing ammonia ($NH_3$) to nitrite ($NO_2$), and then the nitrite to nitrate ($NO_3$). After that, the nitrate ($NO_3$) is transferred into the Second Stage Reactor along with added organic carbon, such as methanol, thereby providing an anoxic substrate for aerobic/anaerobic bacteria to denitrify nitrate ($NO_3$) into nitrogen ($N_2$) gas for atmospheric release. Unfortunately, in performing the conversions, these same bacteria generate carbon dioxide ($CO_2$) and methane ($CH_4$), which is released into the atmosphere as green house gas.

The role of nitrosomonas, nitrobacter and heterotrophic bacteria resident in a bio filter is highlighted by Steven T. Summerfelt and Mark J. Sharrer of CFFI, who discuss nitrification and de-nitrification bacteria generating $CO_2$.

When ammonia is added to water a large percentage combines with the water molecules forming a combined substance called Ammonium. Ammonia combined this way with water is called $NH_4N$ and is ionized, while that which does not combine with water is called non-ionized $NH_3N$. The ratio between the two substances varies with water pH. When pH is high, say 9, the percentage of $NH_3$ is high vs. $NH_4$, and if pH is 6, $NH_4$ is high vs. $NH_3$. A large fraction of $CO_2$ is produced by the nitrification bacteria in the bio filter as they consume 4.6 mg/l of oxygen while producing 5.9 mg/l of $CO_2$ for every 1 mg/l of TAN($NH_3N+NH_4N$) consumed and the heterotrophic bacteria another 1.38 mg/l of $CO_2$ for every 1 mg/l of DO used by nitrification bacteria.

OBJECTS AND SUMMARY

An object of this invention is to provide an improved method and apparatus for eliminating ammonia and reducing nitrite and nitrate and organic carbon concentrations present in industrial tertiary waste-water.

An object of this invention is replacement of bacterial oxidation by the science of matter, the branch of natural sciences dealing with the composition of substances, their properties, associations and dissociations. Dissociation, usually reversible, (association), is a field of science where action of high temperature and pressure causes molecules to split into simpler groups of atoms, single atoms or ions.

According to one embodiment, a sono-molecular-conversion method for effecting nitrification of ammonia in water comprises feeding the water containing ammonia through a sono-molecular conversion device including a plurality of ultrasound transducers, and applying ultrasonic energy to the water containing ammonia by the sono-molecular conversion device to ultrasonically collapse microsized bubbles with transient cavitation in said water containing ammonia to effect nitrification of ammonia therein by sono-molecular-conversion.

This invention is based on the considerable research by the inventor in the field of low-frequency ultrasound with respect to implosive transient cavitations bubble collapse wherein the very high temperatures (5,000° K) and pressures (500 atmospheres) caused nitrification through dissociation of ammonia ($NH_3$) to nitrite ($NO_2$) and nitrite ($NO_2$) to nitrate ($NO_3$) and nitrate ($NO_3$) to nitrogen gas ($N_2+2H_2O+\frac{1}{2}O_2$).

Another embodiment of this invention is mineralization wherein very high temperatures and pressures in conjunction with organic carbon ($CH_3$) or ($CH_4$) caused association where nitrate ($NO_3$) was reverted to nitrite ($NO_2$) and nitrite ($NO_2$) was reverted to ammonia ($NH_3$).

Another embodiment of this invention is that mineralization and nitrification is made possible at any frequency of ultrasound that transient cavitations bubble collapse induces the necessary high temperature and pressure.

Another embodiment of this invention is suspended-solids ultrasonic pulverization which provides a suspended, uninterruptible micron sized inorganic particle flow.

Another embodiment of this invention is release of aqueous entrained anoxic gas ($N_2$) for atmospheric dispersal.

DETAILED DESCRIPTION OF THE PREFERRED EMBODIMENTS

A major technological difference between a bio filter and the sono molecular-conversion processes is that the former relies upon bacterial digestive oxidation processes of living aerobic and anaerobic organisms while the latter relies upon the science of matter, where high temperature and pressure initiates molecular dissociation and association causing molecules to split into simpler groups of atoms, single atoms or ions.

Sono-Molecular-Conversion Nitrification (Dissociation):

The inventor's experimentation, has demonstrated the following interrelationships associated with sono-molecular-conversion nitrification (dissociation) of ammonia ($NH_4/NH_3$). Ammonia/water mixtures were irradiated with ultrasound pressure waves having a frequency of 30 kHz and intensity settings of 2.0, 1.5, and 1.0 $W/cm^2$. The corresponding pressure amplitudes were, respectively, 212 kPa, 150 kPa, and 100 kPa. The ammonia/water concentrations were 2.0, 4.0, 8.0, and 250 mg/L. The water sources, variably experimented with, were municipal, spring and distilled.

Figure 3:
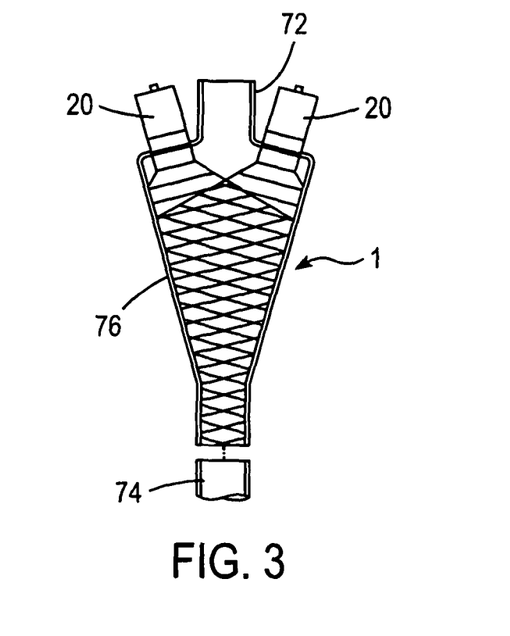
FIG. 3 illustrates a sono-molecular conversion device according to one or more embodiments of the present invention.
Figure 5:
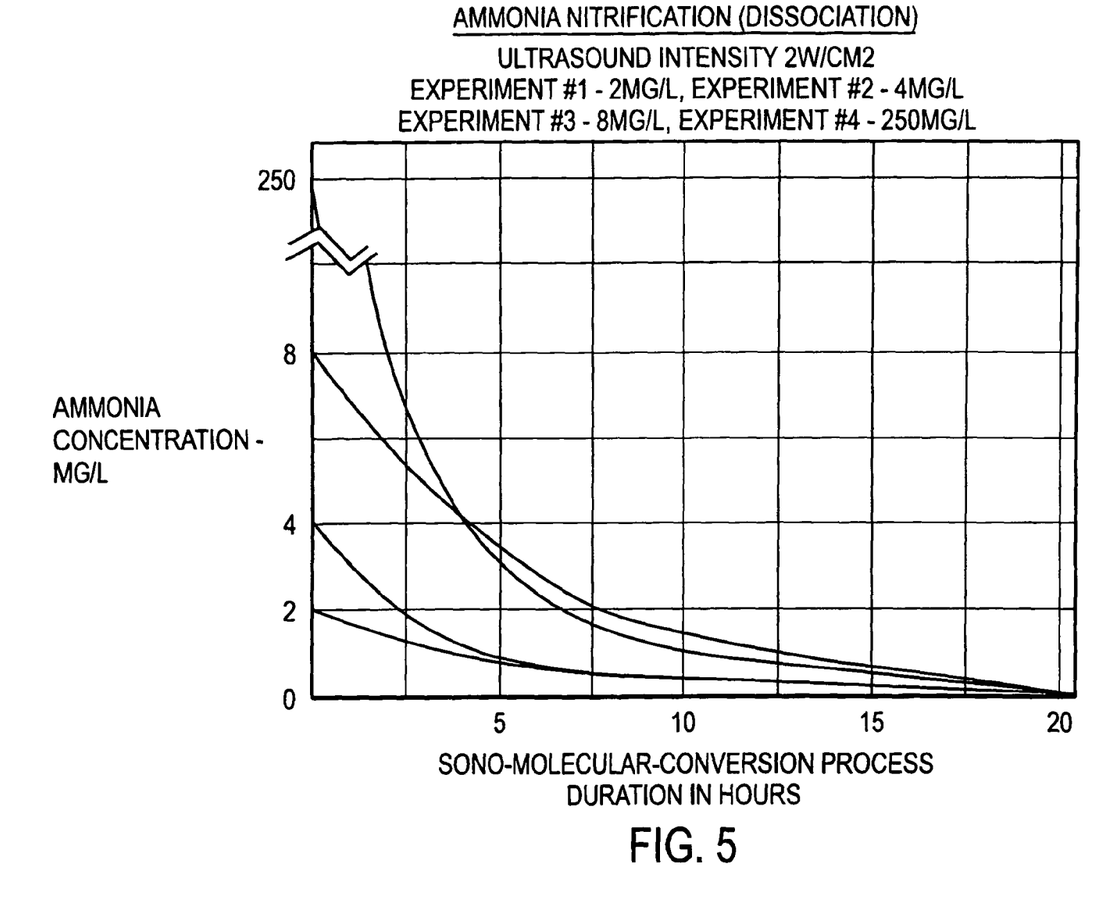
FIG. 5 is a chart showing ammonia nitrification at 2 $W/cm^2$.
Figure 6:
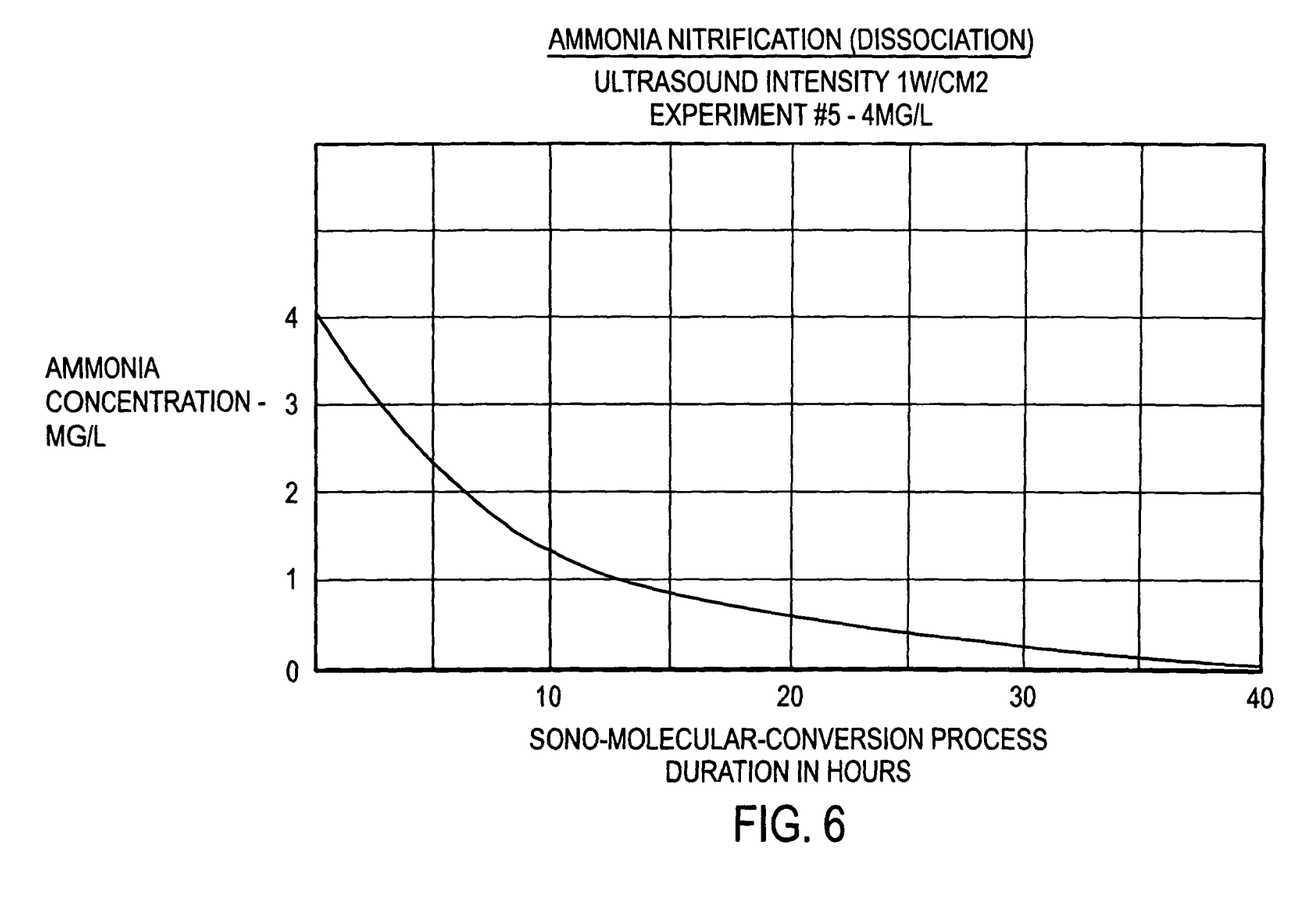
FIG. 6 is a chart showing ammonia nitrification at 1 $W/cm^2$.

FIGS. 5 and 6 and the following tables illustrate the results of the experiments:

EXPERIMENT # 1 - Nitrification (Dissociation)
Results Summary Table - (see FIG. 3)

| Status | pH | DO | $NH_4/NH_3$ | $NO_2$ | $NO^3$ | INTENSITY | TIME |
|---|---|---|---|---|---|---|---|
| Start | 7.6 | 9.5 mg/l | 2 mg/l | 0 mg/l | <5 mg/l | 2 $W/cm^2$ | 0 Hrs |
| Finish | 7.6 | 9.5 mg/l | 0 mg/l | <0.5 mg/l | 10 mg/l | 2 $W/cm^2$ | 21 Hrs |

EXPERIMENT # 2 - Nitrification (Dissociation)
Results Summary Table - (see FIG. 3)

| Status | pH | DO | $NH_4/NH_3$ | $NO_2$ | $NO_3$ | INTENSITY | TIME |
|---|---|---|---|---|---|---|---|
| Start | 7.6 | 10 mg/l | 4 mg/l | 0 mg/l | 5 mg/l | 2 $W/cm^2$ | 0 Hrs |
| Finish | 7.6 | 8 mg/l | 0 mg/l | <0.25 mg/l | 10 mg/l | 2 $W/cm^2$ | 20.5 Hrs |

EXPERIMENT # 3 - Nitrification (Dissociation)
Results Summary Table - (see FIG. 3)

| Status | pH | DO | $NH_4/NH_3$ | $NO_2$ | $NO_3$ | INTENSITY | TIME |
|---|---|---|---|---|---|---|---|
| Start | 7.6 | 9.5 mg/l | 8 mg/l | 0 mg/l | 5 mg/l | 2 $W/cm^2$ | 0 Hrs |
| Finish | 7.6 | 9.5 mg/l | 0 mg/l | <0.25 mg/l | 10 mg/l | 2 $W/cm^2$ | 20.5 Hrs |

EXPERIMENT # 4 - Nitrification (Dissociation)
Results Summary Table - (see FIG. 3)

| Status | pH | DO | $NH_4/NH_3$ | $NO_2$ | $NO_3$ | INTENSITY | TIME |
|---|---|---|---|---|---|---|---|
| Start | 7.6 | 9.5 mg/l | 250 mg/l | 0 mg/l | 5 mg/l | 2 $W/cm^2$ | 0 Hrs |
| Finish | 7.6 | 9.0 mg/l | 0 mg/l | <0.25 mgl | >5 mg/l | 2 $W/cm^2$ | 20 Hrs |

Figure 4:
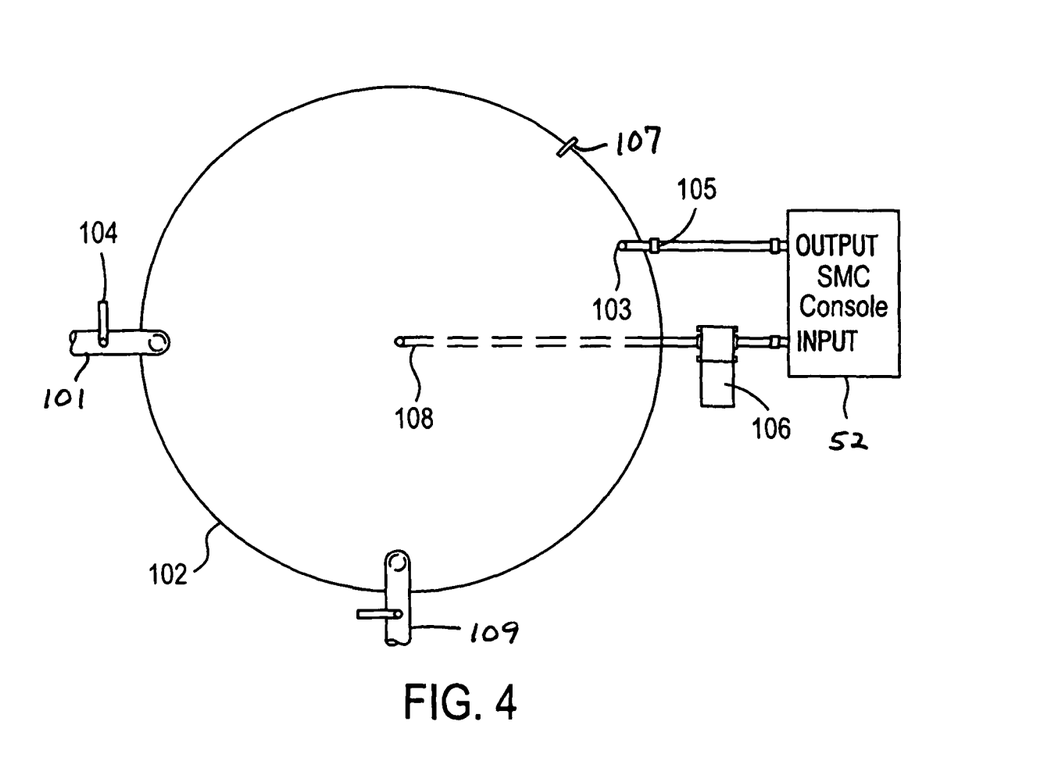
FIG. 4 illustrate a water tank interconnection with the SMC console according to an embodiment of the present invention.

EXPERIMENT # 5 - Nitrification (Dissociation)
Results Summary Table - (see FIG. 4)

| Status | pH | DO | $NH_4/NH_3$ | $NO_2$ | $NO_3$ | INTENSITY | TIME |
|---|---|---|---|---|---|---|---|
| Start | 7.6 | 9.5 mg/l | 4 mg/l | 0 mg/l | 5 mg/l | 1 $W/cm^2$ | 0 Hrs |
| Finish | 7.6 | 10 mg/l | 0 mg/l | 0.25 mg/l | 10 mg/l | 1 $W/cm^2$ | 40 Hrs |

The following observations were made as a result of the experiments:

1) For equal water volumes containing different concentrations of ammonia, the time required to reduce all such varying ammonia concentrations to zero was the same.

2) The time required to decrease a given total ammonia concentration in water to zero was inversely proportional to the applied sono-molecular-conversion intensity, ($W/cm^2$). For example, the time necessary to bring total ammonia concentration in water to zero with an applied sono-molecular-conversion intensity of 2 $W/cm^2$ was half that required at 1 $W/cm^2$.

3) After sono-molecular-conversion irradiation reduced total ammonia concentration in water to zero, the remaining residual concentrations of nitrite and nitrate remained unchanged with continuing sono-molecular-conversion irradiation. Further, at this point, even with several sequentially added ammonia concentrations being reduced to zero by sono-molecular-conversion, the residual concentrations of nitrite and nitrate showed only slight increase.

4) Following initial nitrification, the residual concentration of nitrite was 0.25 mg/L and the residual concentration of nitrate was 5 mg/L.

5) Following each sono-molecular-conversion, nitrification (dissociation) experiment, water pH remained virtually unchanged, i.e., the increase in pH was slight. After each sono-molecular-conversion experiment was completed, the concentration of dissolved oxygen remained the same or showed a slight increase.

6) The above sono-molecular-conversion nitrification (dissociation) experiment results were independent of temperature of the water/ammonia mixture over the range of 48° F. to 87° F.

For the above experiments, an 8.5 liter experimental tank volume contained 8,421,000 mg of water. The ammonia concentrations employed were 2 mg/l, 4 mg/l, 8 mg/l and 250 mg/l. Therefore, the corresponding weight of ammonia was 17 mg, 34 mg, 68 mg and 2125 mg, and the % weight of ammonia in tank water was 0.0002%, 0.0004% 0.0008% and 0.025%.

Water and ammonia molecules weigh the same on the chemical scale. A water molecule consists of 2 atoms of hydrogen and 1 atom of oxygen while an ammonia molecule consists of 1 atom of nitrogen and 3 atoms of hydrogen. When ammonia is added to water having a pH of 7, 99% of the ammonia molecules bond with water molecules forming ammonium ($NH_4$) ions. Ammonium ions repel one another. Ammonia ($NH_3$) is polar and as such readily dissolves in water.

The end result is establishment of a widely separated 3D lattice-work of ammonium ions submerged within the experimental tank water volume. Within the experimental tank water is a seemingly endless invisible fog of micron size contaminant nucleation sites interspersed relatively evenly throughout the water volume. When ultrasonic irradiation commences, a significant number of nucleation sites will form micron size bubbles which, with each succeeding pressure wave, will grow until they finally collapse. This cavitations process is repeated over and over again while ultrasonic irradiation continues. However, since the population of ammonium ions is evenly distributed throughout the water volume, there is an equal chance that the ammonium ion population particular to each ammonia/water concentration will experience the same percentage loss of ammonium ions to nitrification at the same time.

Hence, all the above levels of ammonia/water concentrations will, as the experiment confirmed, complete the reduction of ammonia concentration to zero in the same time period as each curve is asymptotic to zero.

Figure 7:
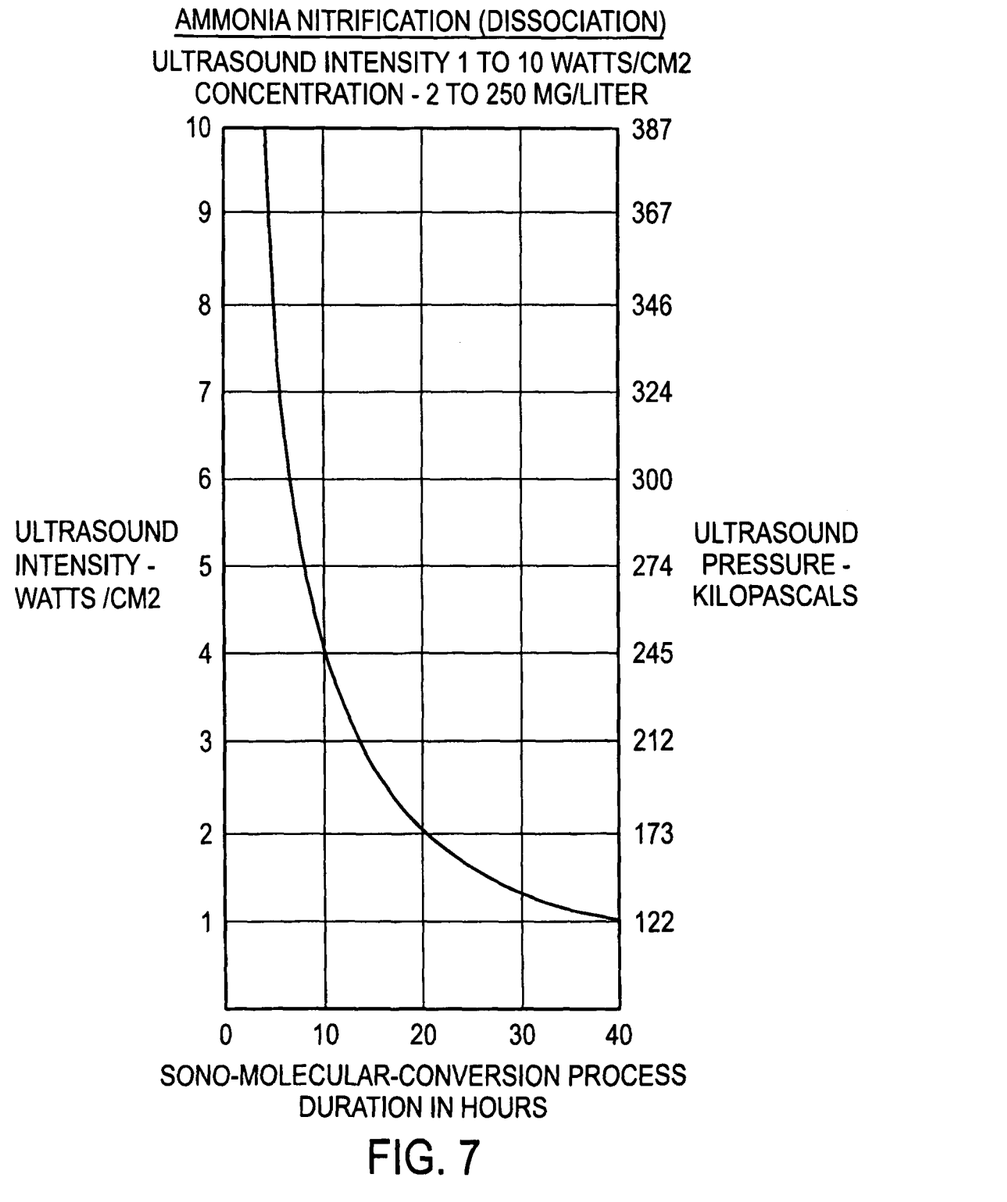
FIG. 7 is another chart showing ammonia nitrification.

It was reported by O.I. Babikov in 1960, that increasing ultrasonic intensity ($W/cm^2$) shortened the time from cavitations bubble initiation to its catastrophic collapse. More precisely, it is an increase in both the rare factional and compressive pressure wave amplitudes that shortens the time from cavitations bubble initiation to its catastrophic collapse. Therefore, increasing the ultrasonic pressure amplitude increases the frequency of all individual micro sized bubble initiation to collapse events than will occur at lower ultrasonic pressure amplitudes. Since each ammonium ion situated adjacent to a collapsing micro sized bubble undergoes the nitrification process it follows that increasing ultrasonic pressure amplitude shortens the time to reduce a given ammonia/water concentration to zero. FIG. 7 demonstrates the relationship between ultrasonic pressure amplitude and the sono-molecular-conversion-process duration, in hours, necessary to reduce all the above ammonia/water concentrations to zero.

Sono-Molecular-Conversion Mineralization:

The inventor also experimented with sono-molecular-conversion of organic waste (uneaten fish-food) into inorganic ammonia. The fish-food/water mixtures were irradiated at an ultrasound frequency of 30 kHz at intensity settings of 2.0 and 1.0 $W/cm^2$. The concentration of fish food was 1.1 gm/L. The water source experimented with was municipal.

FIGS. 5 and 6 and the following tables illustrate the results of the experiments.

EXPERIMENT # 6 - Mineralization
Results Summary Table (TETRAFIN flakes, 0.38 gm/l), (see FIG. 5)

| | pH | DO | NH$_4$/NH$_3$ | NO$_2$ | NO$_3$ | INTENSITY | TIME |
|---|---|---|---|---|---|---|---|
| Denitrification (Association) | | | | | | | |
| Start | 7.4 | 9.5 mg/l | 0 mg/l | 0.25 mg/l | 5 mg/l | 2 W/cm$^2$ | 0 Hrs |
| Finish | | | 0.5 mg/l | 0 mg/l | 0 mg/l | 2 W/cm$^2$ | 3 Hrs |
| Mineralization | | | | | | | |
| Start | | | 0.5 mg/l | 0 mg/l | 0 mg/l | 2 W/cm$^2$ | 3 Hrs |
| Finish | | | 4 mg/l | 0 mg/l | 0 mg/l | 2 W/cm$^2$ | 7 Hrs |
| Nitrification (Dissociation) | | | | | | | |
| Start | | | 4 mg/l | 0 mg/l | 0 mg/l | 2 W/cm$^2$ | 7 Hrs |
| Finish | 7.4 | 9.5 mg/l | 0 mg/l | 0.25 mg/l | 5 mg/l | 2 W/cm$^2$ | 35 Hrs |

EXPERIMENT #7 - Mineralization
Results Summary Table (CHICLID pellets, 0.38 gm/l), (see FIG. 6)

| | pH | DO | NH$_4$/NH$_3$ | NO$_2$ | NO$_3$ | INTENSITY | TIME |
|---|---|---|---|---|---|---|---|
| Denitrification (Association) | | | | | | | |
| Start | 7.4 | 9.5 mg/l | 0 mg/l | 0.25 mg/l | 5 mg/l | 2 W/cm$^2$ | 0 Hrs |
| Finish | | | 1 mg/l | 0 mg/l | 0 mg/l | 2 W/cm$^2$ | 2 Hrs |
| Mineralization | | | | | | | |
| Start | | | 1 mg/l | 0 mg/l | 0 mg/l | 2 W/cm$^2$ | 2 Hrs |
| Finish | | | 8 mg/l | 0 mg/l | 0 mg/l | 2 W/cm$^2$ | 9 Hrs |
| Nitrification (Dissociation) | | | | | | | |
| Start | | | 8 mg/l | 0 mg/l | 0 mg/l | 2 W/cm$^2$ | 9 Hrs |
| Finish | 7.4 | 9.5 mg/l | 0 mg/l | <0.25 mg/l | 5 mg/l | 2 W/cm$^2$ | 42 Hrs |

The inventor's experimentation demonstrated the following interrelationships applicable to sono-molecular-conversion of organic fish waste (uneaten fish-food) into inorganic ammonia.

1) For equal water volumes containing the same measure of organic matter, (fish-food), the time required to reduce organic matter to zero was the same. Zero Organic Matter Concentration was defined as the level of highest ammonia concentration converted by the mineralization process.

2) The time required to decrease a given organic matter concentration to zero (as defined in 1, above) was inversely proportional to the applied ultrasonic intensity (W/cm$^2$). For example, the time necessary to bring organic matter concentration in water to zero with an applied ultrasonic intensity of 2.0 W/cm$^2$ was half that required at 1.0 W/cm$^2$.

3) Following each sono-molecular-conversion mineralization experiment, the water pH remained virtually unchanged, i.e., the increase in pH was slight. After each sono-molecular-conversion mineralization experiment was completed the concentration of dissolved oxygen remained the same or showed a slight increase.

4) Coincident with the point of peak ammonia concentration and the simultaneous reduction of carbon to zero, the nitrification process automatically resumed and continued until the ammonia was reduced to 0.0 mg/L.

Sono-Molecular-Conversion Denitrification (Association):

The inventor's experimentation, demonstrated the following interrelationships are applicable to sono-molecular-conversion denitrification (association) and occurred concurrently with the mineralization conversion of organic matter (uneaten fish-food) to inorganic ammonia.

1) Before denitrification (association), the residual concentration of nitrite in water was <0.25 mg/L and the residual concentration of nitrate was 5 mg/L.

2) Very rapidly following the sono-molecular-conversion initiation of the mineralization process, the above nitrite and nitrate concentrations within the aqueous medium were converted to NH$_3$.

3) Thereafter, nitrite and nitrate concentration remained at 0.0 mg/L throughout the mineralization process, i.e., until the concentration of carbon was exhausted and ammonia concentration had peaked.

4) For equal water volumes containing the same measure of organic matter (uneaten fish-food), the time required to decrease a given residual concentration of nitrite and nitrate to zero was the same.

5) The time to decrease a given concentration of nitrite and nitrate to zero was inversely proportional to applied sono-molecular-conversion intensity (W/cm$^2$).

For example, the time necessary to bring nitrite and nitrate concentration in water to zero with a sono-molecular-conversion intensity of 2.0 W/cm$^2$ was half the time required at 1.0 W/cm$^2$.

6) Following each sono-molecular-conversion nitrification (association) experiment, the water pH remained virtually unchanged, i.e., the increase in pH was slight. After each sono-molecular-conversion nitrification (association) experiment was completed, the concentration of dissolved oxygen remained unchanged or showed a slight increase.

Sono-Molecular-Conversion Nitrification/Mineralization/Denitrification:

Each of the above water/contaminate mixture experiments were conducted separately using discrete but varying measures of ammonia ($NH_3$) and organic fish food.

Nitrification (Dissociation):

Several separate concentrations of $NH_3$ were added to the same, but separate volumes of water. Such mixtures were irradiated at specific sono-molecular-conversion intensities ($W/cm^2$) and with 30 kHz ultrasound to create continuous transient cavitations within the mixture until the $NH_4/NH_3$ concentration was reduced to 0.0 mg/L.

Mineralization:

Similarly, several concentrations of organic fish-food were added to the same, but separate volumes of water. Such mixtures were irradiated at specific sono-molecular-conversion intensities ($W/cm^2$) and with 30 kHz ultrasound to create continuous transient cavitations within the mixtures until the organic (carbon) matter was fully converted into inorganic matter as indicated by the maximum concentration of ammonia converted.

Denitrification (Association):

Concurrent with the reduction of organic matter into inorganic matter (mineralization) it was observed that residual concentrations of nitrite ($NO_2$) and nitrate ($NO_3$) existing in the water volumes before commencement of the mineralization experiment were rapidly reduced to 0.0 mg/L and remained so throughout the mineralization conversion of organic matter to inorganic matter.

The above separate experiment objectives are combinable and function together as one continuous 24/7 synergistic sono-molecular-conversion process to secure the above nitrification, mineralization and association objectives.

In practice, the sono-molecular-conversion intensity ($W/cm^2$), is variably adjusted to the rate of ammonia concentration generated in a given aquaculture tank volume by the quantity of fish contained therein and the quantity of fish-food employed. That is, the sono-molecular-conversion intensity is adjusted in amplitude to reduce ammonia concentration at a rate equal to, or greater than, the combined rate at which the fish gill/urine, fish-food and fish feces are generating ammonia.

The prime-mover for sono-molecular-conversion (SMC), in the aqueous medium is the presence of negative and positive alternating pressure waves which create micro-sized vapor-bubbles which, commensurate with the applied sono-molecular-conversion frequency, collapse upon reaching resonant size by a phenomenon known as transient cavitations. In the fish aquaculture SMC application, frequencies of interest extend over the ultrasonic range 20 to 60 kHz with 30 kHz being the frequency of choice.

The range for the sono-molecular-conversion intensity setting is adjustable from zero to 10 $W/cm^2$, (zero to 387 kPa) which corresponds to safe ammonia concentration reduction rate for fish cultured at a density of 5 $lb/ft^3$ and estimated uneaten feed of 1 gm/L.

The preferred ammonia detoxification apparatus for a Recirculating Aquaculture System illustrated by U.S. patent application Ser. Nos. 10/676,061, 10/912,608 and 11/042,607 is incorporated herein by reference, and is the same apparatus used herein. However, the invention's SMC technology is applicable as a "stand alone" ammonia detoxification device for existing RAS, as well as for integration with municipal and industrial organic waste reduction/conversion applications. The technology is also applicable to removing ammonia from waste waters, such as tertiary industrial waste water.

FIGS. 1A-D are side, rear, plan, and front elevations, respectively, of a sono-molecular conversion apparatus 52 used in one or more embodiments of the present invention that are applicable to removing ammonia from waste waters, such as tertiary industrial waste water.

Incoming water, such as waste water containing ammonia, is input through input 22 with the assistance of a peristaltic pump 5. The incoming water flows up through a pipe 26 into a first sono-molecular converter (SMC) 1, a more detailed view of which can be seen in FIG. 3. After exiting from the top of SMC 1, the fluid passes through a horizontal pipe 28 into a second SMC 1'. The water exiting the second SMC 1' travels through a pipe 25 and out through output 24.

Figure 1A:
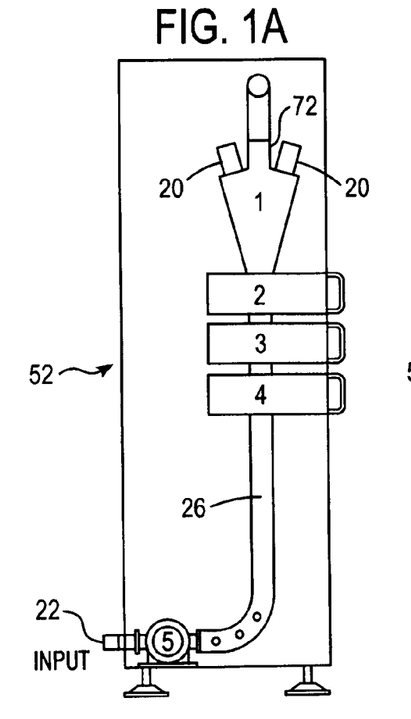
FIGS. 1A through 1D illustrates views of a self-contained, SMC console containing the components necessary to decontaminate industrial tertiary waste water in-flow according to an embodiment of the present invention.
Figure 1B:
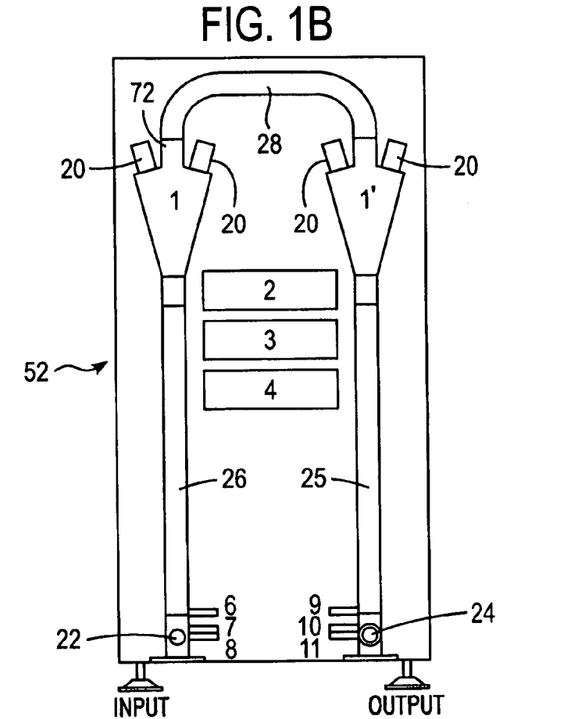
Figure 1C:
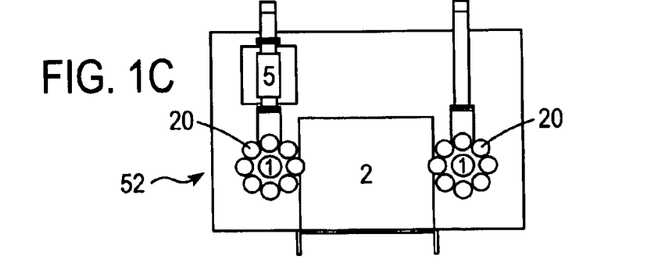
Figure 1D:
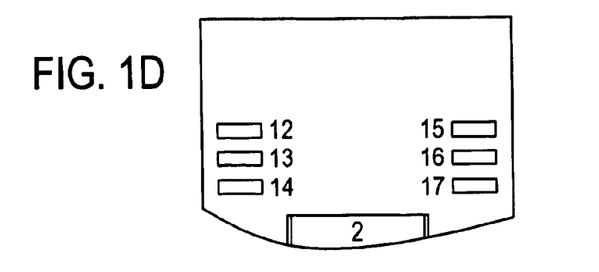

As best seen in FIG. 1C, each SMC includes 8 transducers 20 arranged in a circular pattern about a top portion of the SMC.

An ultrasonic generator 2 generates ultrasonic energy and supplies the energy to the transducers 20. A console 3 includes electronics for controlling the water quality probes 6, 7, 8, 9, 10, 11 and water quality indicators 12, 13, 14, 15, 16, and 17, illustrated in FIGS. 1B and 1D. A power supply 4 provides power to the various components of the sono-molecular conversion apparatus.

Figure 2A:
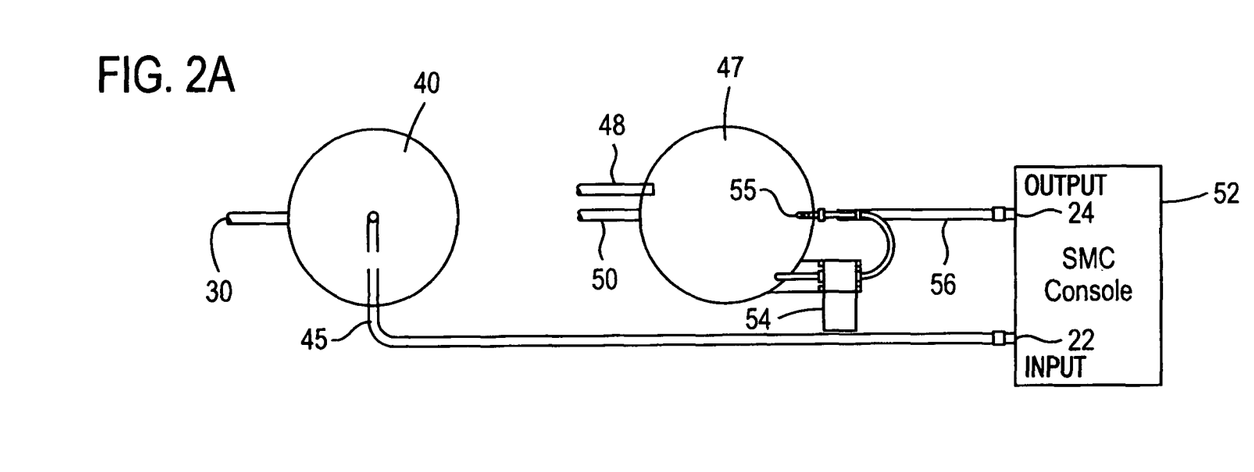
FIGS. 2A and B illustrate water tank interconnections with the SMC console according to an embodiment of the present invention.
Figure 2B:
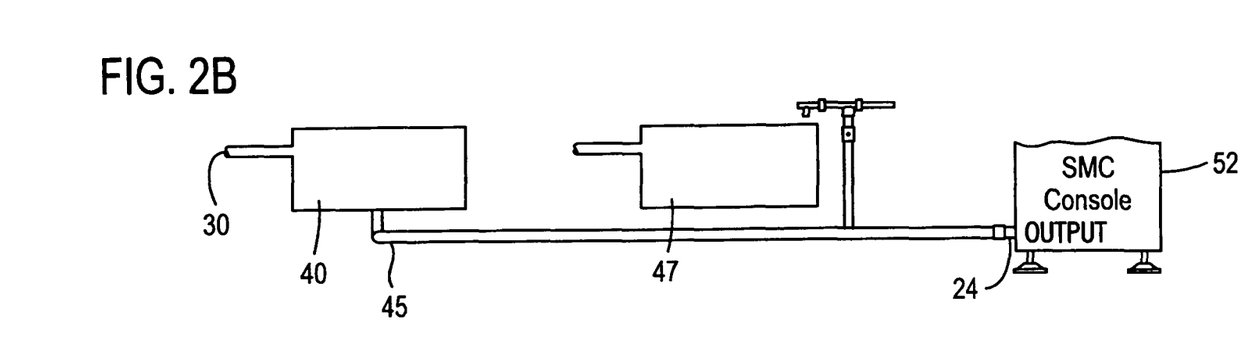

FIGS. 2A and 2B are a plan view and a side view, respectively, of a single pass system utilizing the sono-molecular conversion apparatus 52 illustrated in FIGS. 1A-D. Water contaminated with ammonia is input into a contaminated tank 40 via an input 30. At the bottom of the contaminated tank 40, an output pipe 45 conveys the contaminated water to the sono-molecular conversion apparatus 52, which is illustrated in FIGS. 1A-D. The contaminated water enters the sono-molecular conversion apparatus 52 via the input 22. The treated water leaves the sono-molecular conversion apparatus 52 via the output 24 into pipe 56. Pipe 56 delivers the treated water into a clean tank 47 via a nozzle 55. Pipe 48 provides make up water, as needed, for water lost to evaporation and/or provide seed water for the jet-pump venturi after pipe 50 has conveyed decontaminated water from tank 47 to the destination required.

The pipe 56 also includes a jet-pump venturi faucet 54 for creating a low pressure region in which nitrogen gas is extracted from the clean water and expelled to atmosphere.

The sono-molecular converter 1 is illustrated in cross-section in FIG. 3. At the bottom of the SMC 1 is a first conduit 74 which can function as either an inlet or an outlet for the SMC 1. At a region 76, above the first conduit 74, the diameter, and thus volume, of the SMC 1 is increased. A plurality, e.g., eight, transducers 20 are equally spaced in a semicircular manner at the top of the SMC 1. The transducers 20 are angled so as to input ultrasound energy in an overlapping manner, as illustrated in FIG. 3.

At the top center of the SMC 1 is a second conduit 72 that can function as either an inlet or an outlet for the SMC 1. In view of the fact that the SMC 1 has a larger diameter at the expanded region 76, water flowing through conduits 72, 74 is slowed down while it is resident in the center section 76, thus increasing the dwell time of the liquid within the SMC 1. As necessary, conduits 72 and 74 will be fitted with diffusers to lower water flow kinetic energy to ensure complete filling of the cone shaped volume 76 at all times.

SMC 1 comprises two sections; an upper section comprising a circular stainless steel machined casting and a coned shaped stainless steel lower section. The machined casting and cone shaped section are bolted together and water sealed with an "O" ring gasket to form 72, 74 and 76.

Each of the eight transducers 20 comprise four elements, 1) an upper section containing a non-reflective component, 2) a piezo crystal bonded to the non-reflective upper section, 3) a polished stainless steel body with a threaded hole through its center and whose body is epoxy-bonded to a polished surface on the stainless steel casting and 4) a threaded bolt which passes through 1) and 2) and through thread tightening 3, anchors 1), 2) and 3) to the assembly comprising 72, 74 and 76.

According to a second embodiment of the present invention, a recirculating system is illustrated in FIG. 4. A cleaning tank 102 having a diameter of 26 feet and a tank capacity of 70,800 liters is fed by a pipe 101 with an inflow regulator 104. A pipe 108 connects the cleaning tank 102 to the sono-molecular conversion apparatus 52. The sono-molecular conversion apparatus 52 is the same equipment illustrated in FIGS. 1A-D. A centrifugal pump and motor 106 pump liquid from the cleaning tank 102 to the sono-molecular conversion apparatus 52. In addition a pipe 103 delivers the output from the sono-molecular conversion apparatus 52 back to the cleaning tank 102. Positioned along pipe 103 is a jet pump venturi faucet 105 which removes nitrogen gas from the liquid passing through the pipe 103. Another pipe 109 is connected to the cleaning tank 102 to remove processed water from the tank after processing is complete.

If, during processing, the water level in the tank 102 becomes low due to evaporation or other causes, make-up water can be added through pipe 107.

In view of the large capacity of the tank 102, it is not possible to remove all of the ammonia from the tank 102 in one pass through the sono-molecular conversion apparatus 52. As a result, the system illustrated in FIG. 4 is a recirculating system, wherein the liquid is recirculated between the tank 102 and the sono-molecular conversion apparatus 52 a number of times, for example, 15 to 30 times.

The normal cleaning tank 102 recirculation rate of flow, while the effluent is within the sono-molecular conversion apparatus 52, is reduced to lower the required number of recirculation cycles. Optimization appears to occur when the sono-molecular conversion apparatus 52 rate of flow in liters/minute times the number of recirculation cycles equals the complete nitrification and association time period.

For example, if the cleaning tank capacity is 70,800 liters, and the circulation rate=1180 liters/minute, the complete recirculation time equals 70,800/1180=60 minutes.

During recirculation, every liter of effluent spends in the order of 1 minute in transition through the SMC 1 device. To effect complete ammonia removal at 80 W/cm$^2$, every liter of effluent must transition through the SMC 1 device for 30 minutes, regardless of ammonia concentration. It follows that complete ammonia removal with one SMC 1 device takes 30 recirculation cycles (30 hours). When two SMC 1 devices are employed, ammonia removal time is reduced to 15 hours.

Figure 8:
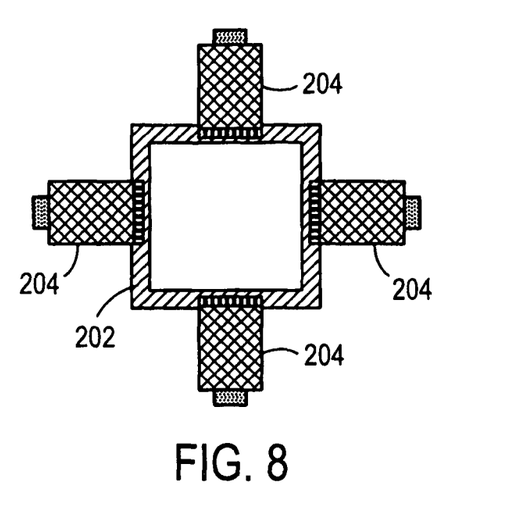
FIG. 8 is an illustration of a known connection of ultrasound transducers to a flow pipe.

With two SMC devices, after 15 hours, an ammonia concentration of 300,000 mg/liter in the cleaning tank 102 will remove 300,000×70800/1000×453.6=46,825 lbs of ammonia or 46,825/15×24=74,920 lb/day Also of importance is the location and arrangement of the ultrasonic transducers. Current sono chemical practice relies upon positioning ultrasonic transducers around the external periphery of existing piping. Often such transducers will be placed facing each other on opposite sides of a pipe, i.e., in juxtaposition, resulting in standing ultrasonic waves or wave cancellation with unreliable and unpredictable results. Such a state-of-the-art flow through technique is illustrated in FIG. 8, wherein a pipe 202 has a plurality of transducers 204 arranged facing each other on opposite sides of the pipe 202.

The placing of the ultrasonic transducers 20 in the same plane, equi-spaced in a circular pattern, at an inclined angled, as illustrated in FIGS. 1C and 3, and all operating at the same frequency from one ultrasonic power source, makes for focused ultrasonic intensity magnification without incurring pressure wave interference. The result therefore is predictable sono-molecular dissociation.

With regard to the embodiments illustrated in FIGS. 1-4, the exact processes occurring in the SMC depends on which input effluent constituents are mixed with the waste water.

When the input constituents are organic materials such as organic carbon ($CH_3$) or ($CH_4$) and nitrates ($NO_3$), the process associates the $NO_3$ to $NH_3$ and mineralizes the organic carbon into ammonia ($NH_3$). In this situation, mineralization is the dominant process. Whenever organic carbon exists the SMC will first mineralize the organic material, i.e., dissociating it into inorganic ammonia. Once the organic carbon is exhausted the SMC will automatically revert to the practice of nitrification (dissociation) with the end result being $N_2$.

When the input constituent is nitrate ($NO_3$) only, the process nitrifies (dissociates) the nitrates ($NO_3$) to $N_2$.

When the input constituent is ammonia only, the ammonia is converted by nitrification (dissociation) into $NO_3$, then to $N_2$.

After the nitrification (dissociation) has been completed, the effluent is routed to the jet-pump venturi faucet to bring entrained $N_2$ gas out of solution for release to atmosphere. The effluent is then discharged in aqueous form for detoxified release as required.

Figure 9:
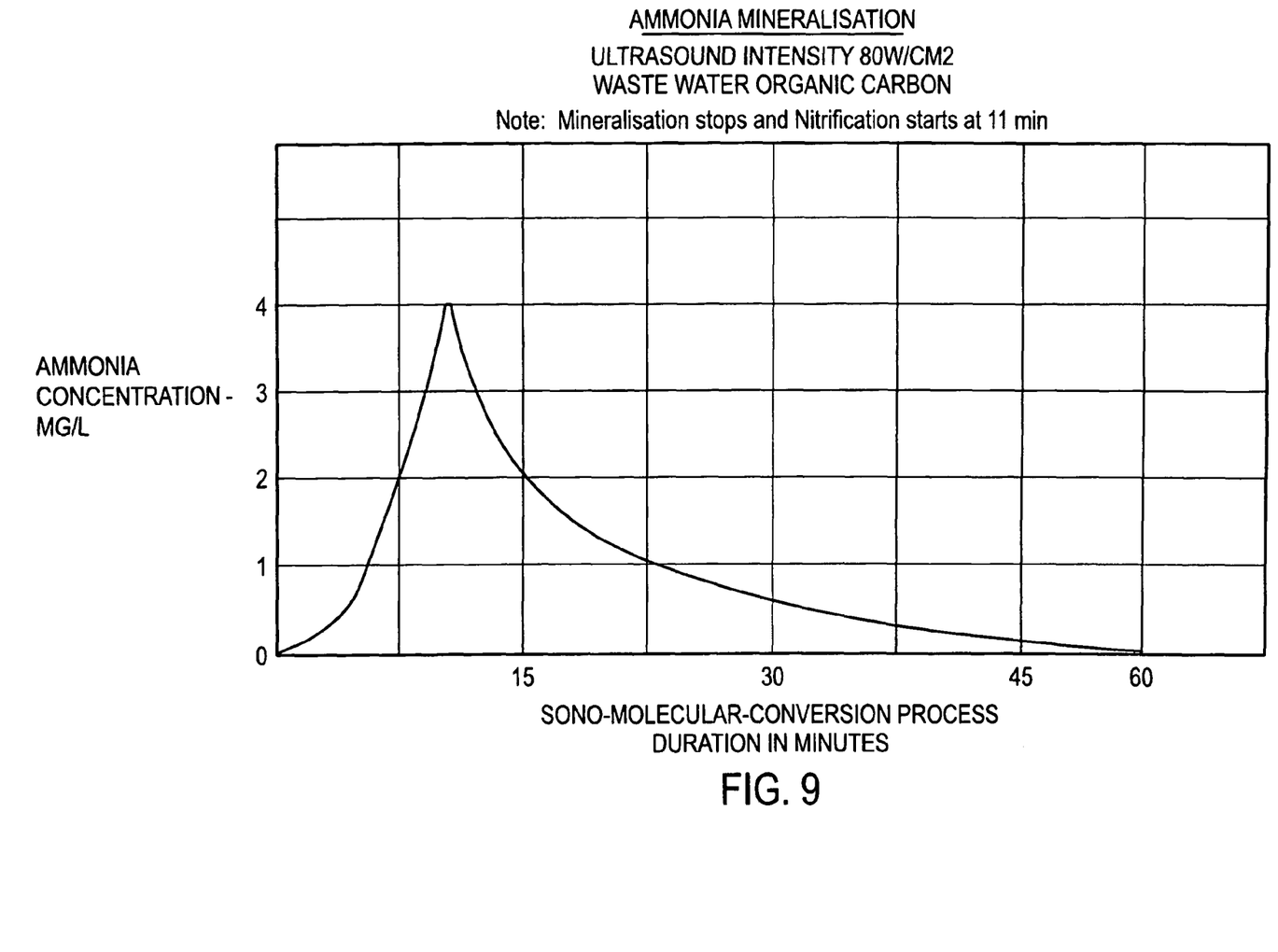
FIG. 9 is a chart showing ammonia mineralization at 80 $W/cm^2$.

FIG. 9 demonstrates that, at the point of organic carbon exhaustion, the transition from mineralization to nitrification (dissociation) is automatic.

Figure 10:
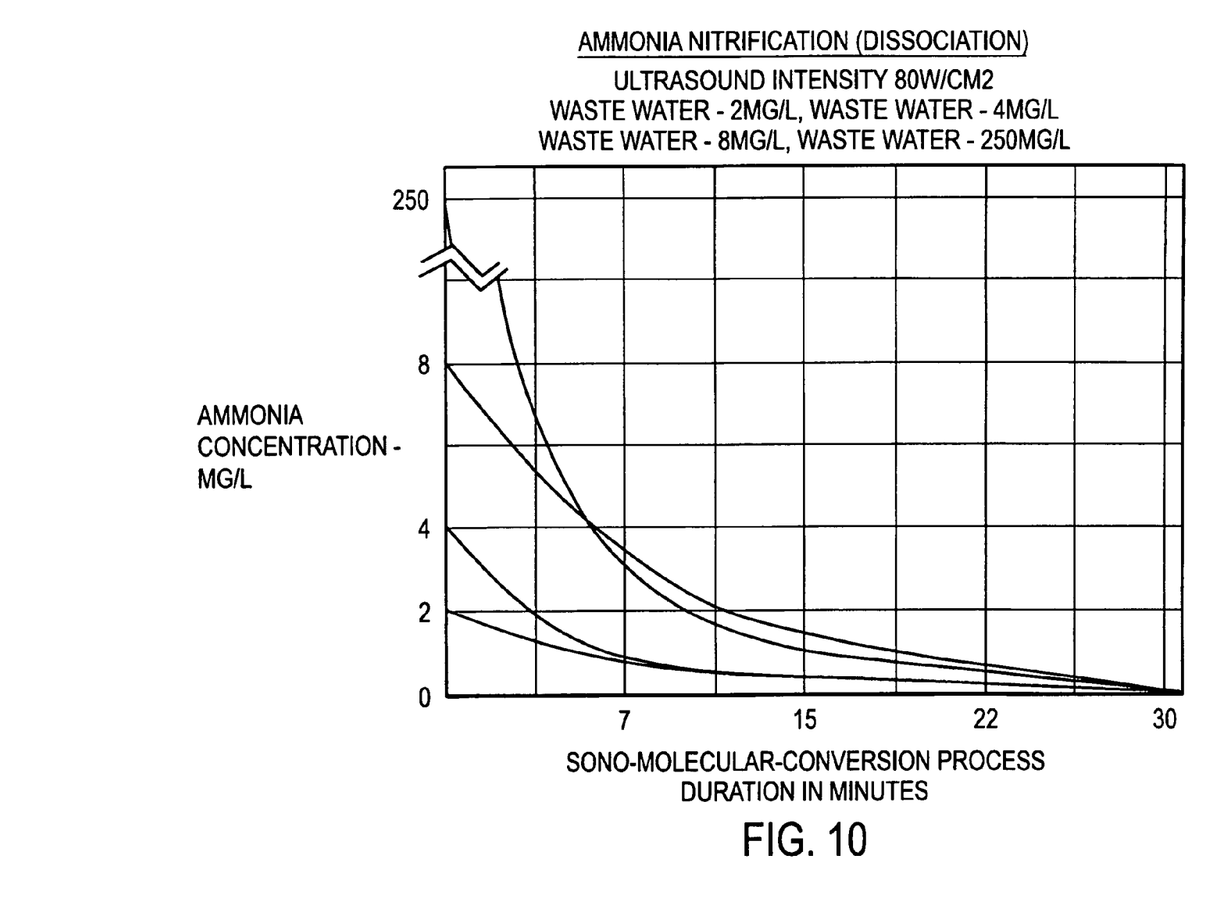
FIG. 10 is another chart showing ammonia nitrification at 80 $W/cm^2$.

FIG. 10 demonstrates that regardless of ammonia concentration, sono-molecular conversion nitrification (dissociation) will take place in the same time period. Unlike bacteria driven processes, sono-molecular conversion requires no oxygen, or alkali or acid addition for pH adjustment.

Environmental Impact:

In the year 2005, U.S. Steel's ammonia discharge rate into Lake Michigan was 19 lb/day, British Petroleum's 2007 Permit allows 1582 lb/day, and unregulated paper makers discharge approximately 61,000 lb/day.

Given a sono-molecular conversion system operating at an acoustic intensity of 80 W/cm$^2$, the time required to reduce all ammonia concentrations up to 300,000 mg/l to zero for the single pass embodiment illustrated in FIGS. 2A and 2B, and for the re-circulating system of FIG. 4, is approximately thirty minutes. See FIG. 10.

The single pass embodiment illustrated in FIGS. 2A and 2B has a maximum ammonia removal rate of approximately 114 lb/day. The re-circulating system of FIG. 4 has a maximum ammonia removal rate of approximately 74,920 lb/day. By contrast, a bio-film SBR has a maximum removal rate of approximately 67 lb/day In a sono-molecular conversion system, aqueous entrained gases such as nitrogen ($N_2$) and ammonia ($NH_3$, if present) are rapidly released to atmosphere with a jet pump venturi faucet which prevents these entrained gases from being discharged into public waterways or large lakes. The jet pump venturi faucet device features a high vacuum (⅓ atmosphere) rather than the design-limited low vacuum (1/100 atmosphere) illustrated and claimed in U.S. Patent No. jet pump/venture faucet U.S. Pat. No. 5,665,141.

The sono-molecular conversion ultrasonically pulverizes low-level concentration (ppm) suspended organic solids into micron size inorganic particles, thereby posing no sludge-forming organic solids ecosystem threat to public waterways or large lakes.

Sono-molecular conversion, due to the extreme pressures and temperatures involved in ultrasonic transient cavitations, concurrently destroys bacteria, viruses, algae, parasites, and converts PCB and DDT into harmless short term acids. It has also been shown to effect cold evaporation of methyl mercury for filter collection before detoxified effluent is returned into the cleaning tanks.

A battery of bio-film SBRs' removing 74,920 lb of ammonia would emit 138 tons of $CO_2$ into the stratosphere. By contrast; one sono-molecular conversion system removing 74,920 lb of ammonia emits no green house gases.

Sono-molecular conversion reduces PCB and DDT into harmless short-term acids and has the potential to effect cold evaporation of methyl mercury for collection. An SBR bio-film has no impact on these industrial pollutants of the Great Lakes eco system.

Sono-molecular conversion converts organic waste to inorganic and destroys algae and parasites that pollute the Great Lakes eco system. SBR bio-film has no impact on these pollutants.

Carbon Dioxide:

The same structure disclosed herein used for treating ammonia, nitrites, and nitrates, can also be used to reduce $CO_2$ content in waste water. $CO_2$ in passing through sono-molecular-conversion at 5000° K and 500 atmospheres undergoes thermal/pressure decomposition and subsequent dissociation to $CO_2$, $CO+O_2$. After 24 hours of dissociation, 222.3 kg of $CO_2$ yields 72.69 kg $CO_2$+95.16 kg CO+54.48 kg $O_2$. Since $CO_2$ and CO gases are continuously discharged to atmosphere there will be no build-up.

Although the invention has been described in terms of particular embodiments and applications, one of ordinary skill in the art, in the light of this teaching, can generate additional embodiments and modifications without departing from the spirit of or exceeding the scope of the claimed invention. Accordingly, it is to be understood that the drawings and the descriptions herein proffered by way of example to facilitate comprehension of the invention and should not be construed to limit the scope thereof.

What is claimed is:

1. A sono-molecular-conversion method for effecting nitrification of ammonia in water, the method comprising:
   feeding the water containing ammonia through a sono-molecular conversion device including a plurality of ultrasound transducers; and
   applying ultrasonic energy to the water containing ammonia by the sono-molecular conversion device to ultrasonically collapse microsized bubbles with transient cavitation in said water containing ammonia to effect nitrification of ammonia therein by sono-molecular-conversion.

2. The method according to claim 1, further comprising controlling, either manually or automatically, a duration of the sono-molecular-conversion process, whereby the time of sono-molecular-conversion can be increased or decreased to reduce a concentration of ammonia to zero.

3. The method according to claim 1, further comprising monitoring ammonia levels in the water.

4. The method according to claim 3, wherein the method further includes continually or periodically monitoring the ammonia levels and automatically adjusting the intensity of the ultrasonic energy in response to changes in the ammonia levels.

5. The method according to claim 1, wherein the ultrasonic energy is applied to the water at an intensity sufficient to enable nitrification of ammonia therein at ammonia concentrations of up to 300,000 mg/l.

6. The method according to claim 1, wherein the water is tertiary waste water.

7. The method according to claim 1, wherein the water is first placed in a first tank, and the water from the first tank is fed to the sono-molecular conversion device; and after the water is treated by the sono-molecular conversion device, the water is then fed into a clean tank.

8. The method according to claim 7, wherein a venturi low pressure is applied to the water between the sono-molecular conversion device and the clean tank to remove $N_2$ gases from the water.

9. The method according to claim 1, wherein the water is first placed in a recirculating tank, and the water is fed back and forth between the recirculating tank and the sono-molecular conversion device repeatedly.

10. The method according to claim 9, wherein a venturi low pressure is applied to the water between the sono-molecular conversion device and the recirculating tank to remove $N_2$ gases from the water.

11. The method according to claim 1, wherein the sono-molecular conversion device includes an enlarged chamber to increase dwell time of the water in the sono-molecular conversion device.

12. The method according to claim 1, wherein the water containing ammonia is fed serially through two sono-molecular conversion devices.

13. A sono-molecular-conversion method for effecting nitrification of ammonia in water, the method comprising:
   feeding the water containing ammonia through a sono-molecular-conversion device comprising:
      a primary chamber having a first end and a second end, and wherein a diameter of the second end is a maximum diameter, and the diameter of the primary chamber gradually tapers to a minimum diameter at the first end;
      a first conduit leading into the first end of the primary chamber;
      a second conduit leading into the second end of the primary chamber, wherein the first end is at an opposite side of the primary chamber as the second end; and
      a plurality of ultrasound transducers arranged at the second end of the primary chamber so as to emit ultrasonic energy into the primary chamber;
      wherein the plurality of ultrasound transducers are focused toward the first end of the chamber; and
   applying energy to the water containing ammonia by the sono-molecular-conversion device causing necessary high temperature and pressure from collapsing micro sized bubbles in said water containing ammonia to effect nitrification (dissociation) of ammonia therein by sono-molecular-conversion.

* * * * *